(12) United States Patent
Yang

(10) Patent No.: US 11,312,312 B2
(45) Date of Patent: Apr. 26, 2022

(54) ROOF RACK FIXING STRUCTURE

(71) Applicant: FORMOSA SAINT JOSE CORPORATION, Taipei (TW)

(72) Inventor: Ming-Shun Yang, Taipei (TW)

(73) Assignee: FORMOSA SAINT JOSE CORPORATION, Taipeit (TW)

( * ) Notice: Subject to any disclaimer, the term of this patent is extended or adjusted under 35 U.S.C. 154(b) by 0 days.

(21) Appl. No.: 16/771,886

(22) PCT Filed: Dec. 10, 2018

(86) PCT No.: PCT/CN2018/120055
§ 371 (c)(1),
(2) Date: Jun. 11, 2020

(87) PCT Pub. No.: WO2019/227889
PCT Pub. Date: Dec. 5, 2019

(65) Prior Publication Data
US 2021/0362660 A1 Nov. 25, 2021

(30) Foreign Application Priority Data
May 29, 2018 (CN) .......................... 201810532689.0

(51) Int. Cl.
*B60R 9/058* (2006.01)
*B60R 9/052* (2006.01)

(52) U.S. Cl.
CPC .............. *B60R 9/058* (2013.01); *B60R 9/052* (2013.01)

(58) Field of Classification Search
CPC ................................ B60R 9/052; B60R 9/058
USPC ................. 224/314, 319, 322–323, 329–331
See application file for complete search history.

(56) References Cited

U.S. PATENT DOCUMENTS 9,566,913 B2 * 2/2017 Sarges .................... B60R 9/045
2017/0349080 A1 * 12/2017 Sautter ..................... B60P 3/34

FOREIGN PATENT DOCUMENTS

DE 4001546 A1 * 7/1991 ............ B60R 9/045
TW M261419 U * 4/2005

* cited by examiner

Primary Examiner — Scott T McNurlen
(74) Attorney, Agent, or Firm — Ian Oglesby

(57) ABSTRACT

The present invention discloses a roof rack fixing structure, used to fix a roof rack on a car top. The roof rack fixing structure includes a frame case with an opening; a first fastener; a second fastener; and a knob rod. With the implementation of the present invention, the roof rack fixing structure is firmly combined with the roof rack; more than one combining positions provided by the second fastener to be adaptive to various cars; and the position of the first fastener complies with the width of the roof rack rods on the car with no risk of loosening from it; moreover, with further implementation of an anti-theft lock, the roof rack fixing structure can be locked and secured and the risk of driving due to movement or loosening of the roof rack fixing structure is eliminated.

9 Claims, 8 Drawing Sheets

ROOF RACK FIXING STRUCTURE

BACKGROUND OF THE INVENTION

1. Technical Field

The present invention relates to fixing structures, and more particularly, to roof rack fixing structures for car applications.

2. Description of Related Art

As cars are being in wide use nowadays and as car driving recreation needs changes, consumers' demands for roof boxes are drastically increasing. While using roof boxes on cars, a roof rack fixing structure or apparatus for fixing the roof boxes together with roof racks on top of cars is absolutely needed.

However, every known existing fixing structure for roof racks in the market or being used is basically a fix unit with limited application width range or height flexibility by a rotating piece that comes with a fatal defect of being possessing different inclined angle when adjusted to different height required, that makes the fix unit being unable to attach close to the roof rack and vulnerable to wind or vibration when driving to have great unpredictable danger and intolerable threat for people in car or on the road.

That results in the needs and innovative breakthrough for the creative invention of a roof rack fixing unit or structure with innovative insert piece and fasteners that not only applicable to multiple car types by changing the insert position of the insert piece and changes the height required, but also being able to combine tight and close to the roof rack preventing being loose or separating from the roof rack.

SUMMARY OF THE INVENTION

The present invention discloses roof rack fixing structures, used to fix a roof rack on a car top. The roof rack fixing structures each includes a frame case with an opening; a first fastener; a second fastener; and a knob rod. With the implementation of the present invention, the roof rack fixing structure is firmly combined with the roof rack; more than one combining positions provided by the second fastener to be adaptive to various cars; and the position of the first fastener complies with the width of the roof rack rods on the car with no risk of loosening from it; moreover, with further implementation of an anti-theft lock, the roof rack fixing structure is secured and the risk of driving due to movement or loosening of the roof rack fixing structure is eliminated.

The present invention provides a general purpose roof rack fixing structure, used to fix a roof rack on top of a car, comprising: a frame case, being formed by a solid material, comprises at least an opening, a linking part fixedly combined with the roof rack, at least one partition board fixedly installed inside the frame case, and a nut stand; a L shaped first fastener, being formed by a solid material, detachably connected to the frame case; a L shaped second fastener, being formed by a solid material, comprises an insert piece and a fixing piece with a slot, wherein the fixing piece is formed by bending and extending the insert piece, wherein the insert piece being detachably insert into the opening and fixed in between two partition boards or in between a partition board and the frame case; and a knob rod, being inserting through the slot and fixing the second fastener to the nut stand through the fixing piece.

The present invention also provides a dedicated type roof rack fixing structure, used to fix a roof rack on top of a car, comprising: a frame case, being formed by a solid material, comprises at least an opening and a linking part fixedly connected to the roof rack; a first fastener, being L shaped and formed by a solid material, detachably connected to the frame case; a second fastener, being L shaped and formed by a solid material, comprises an insert piece and a fixing piece, wherein the fixing piece being a bended extension of the insert piece, wherein the insert piece being detachably insert into the opening and fixed inside the frame case; and a knob rod, being fixing the second fastener from the fixing piece to the frame case.

Implementation of the present invention at least involves the following inventive steps:

1. Roof rack fixing structure securely clamps the roof rack to prevent loose or slipping.
2. By means of changing the fixing position of the insert piece, the general purpose roof rack fixing structure is being able to adjust the height of clamping to provide applications to multiple car types with one single roof rack fixing structure.
3. Applicable to open type or closed type roof racks in the market with the innovative design of the first fastener and the second fastener.
4. Antitheft part can be easily installed for safe use and antitheft function.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE SEVERAL VIEWS OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE EMBODIMENTS OF THE INVENTION

Figure 1:
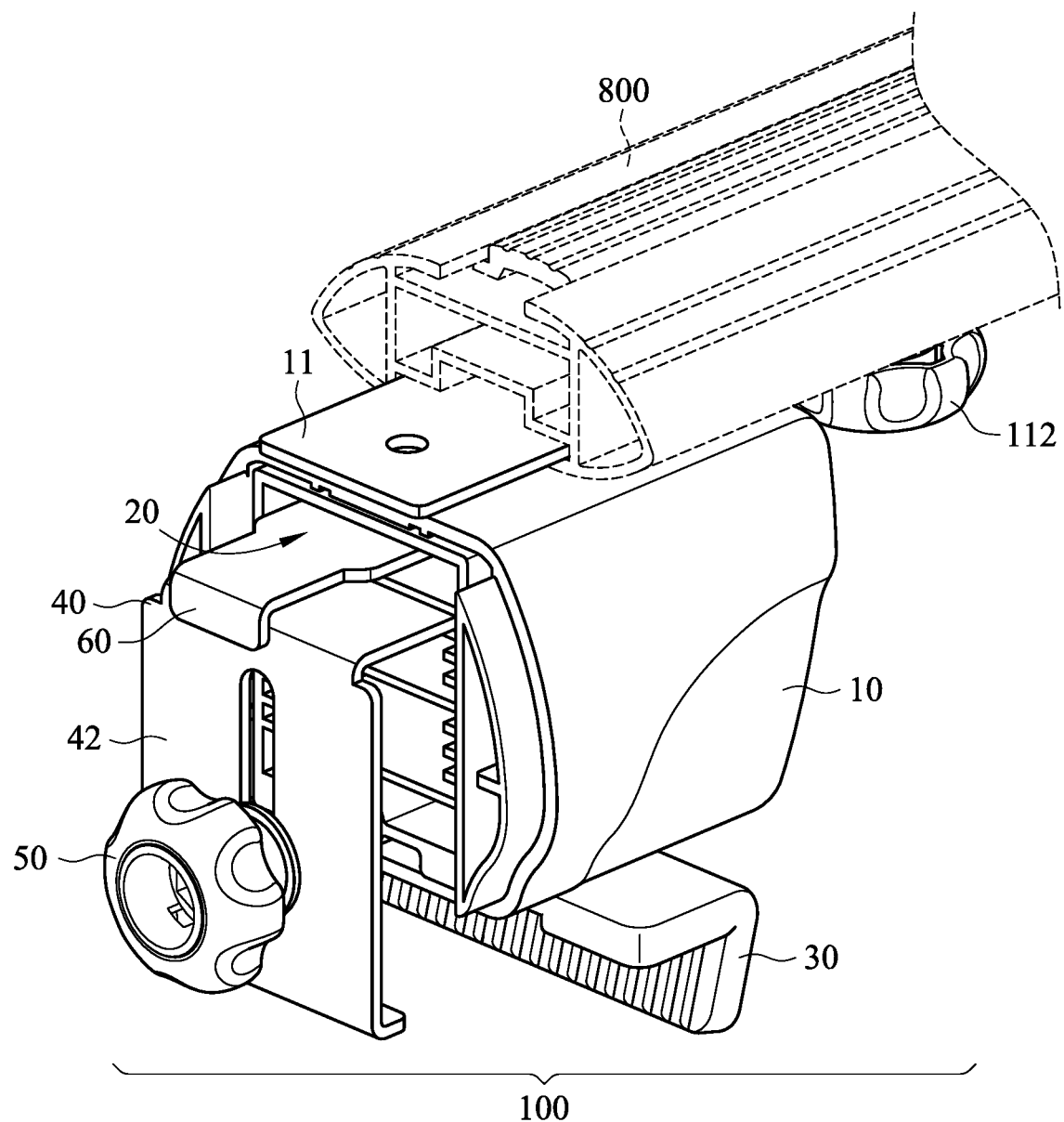
FIG. 1 is a schematic three-dimensional diagram of a roof rack fixing structure according to an embodiment of the present invention.
Figure 2:
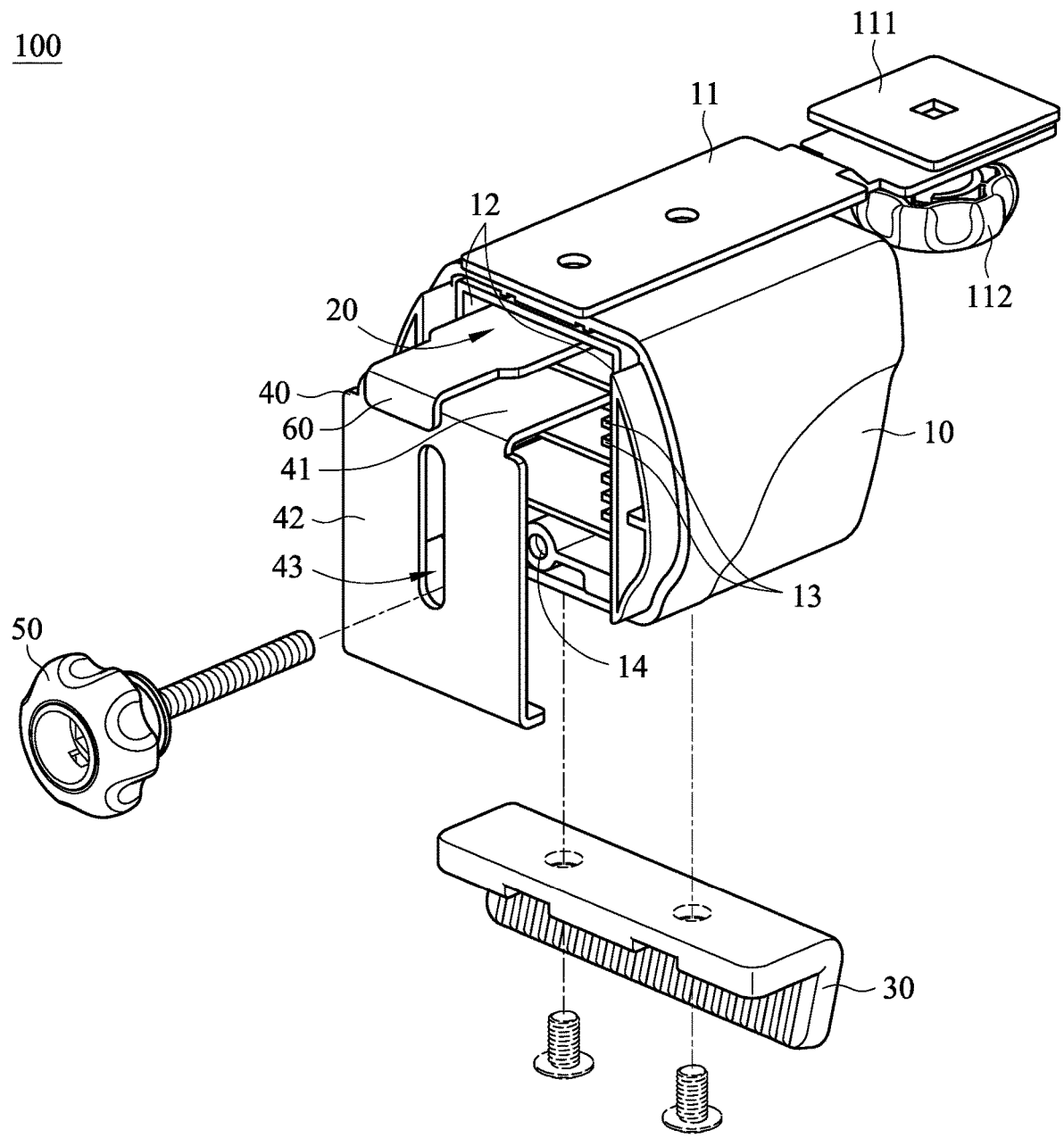
FIG. 2 is a schematic three-dimensional partial exploded view of a roof rack fixing structure according to an embodiment of the present invention.

Please refer to FIG. 1 and FIG. 2, in an embodiment of the present invention, a general purpose roof rack fixing structure 100 includes a frame case 10; a first fastener 30; a second fastener 40; and a knob rod 50.

As shown in FIG. 1 and FIG. 2, being made by a sturdy material, frame case 10 has at least one opening 20, a nut stand 14 and a linking part 11 which being fixed firmly to a roof rack 800, wherein two opposite side surfaces 12 next to the opening 20 inside the frame case 10 are respectively provided with at least one partition board 13 each, wherein the partition boards 13 on either side surfaces 12 are paired as a group.

As can be seen in FIG. 1 and FIG. 2, the linking of the roof rack fixing structure 100 together with the roof rack 800 is accomplished by sliding an insertion part 111 of the linking part 11 on the roof rack fixing structure 100 into the tube of the roof rack 800, and then tighten a knob 112 to fix firmly the roof rack fixing structure 100 on the roof rack 800.

Wherein the position of the linking part 11 on the frame case 10 can be on the surface of the frame case 10, or the linking part 11 comes penetrating the frame case 10 and being fixed firmly on the hook piece 60.

As also shown in FIG. 1 and FIG. 2, the first fastener 30, which can be made of one of sturdy materials, is being detachably connected to the frame case 10. In an embodiment, the first fastener 30 is detachably connected to a surface opposite to the linking part 11 on the frame case 10.

As can be seen in the embodiment shown in FIG. 2, the method of detachably connecting the first fastener 30 to the frame case 10 is by applying a screw set and turning the screw in or out the screw hole.

Please refer also to FIG. 1 and FIG. 2, as for the second fastener 40, which can also be made of a solid material, is being a bended part composes of an insert piece 41 and a fixing piece 42, wherein the fixing piece 42 being formed as an extension of the insert piece 41 by bending, and a slot 43 can be further formed on the fixing piece 42. Said slot 43 can be in the middle portion of the fixing piece 42.

Said insert piece 41, being detachably inserted into the frame case 10 through the opening 20, stops and fixed in between two partition boards 13, or in between a partition board 13 and the frame case 10.

And as shown in FIG. 1 and FIG. 2, in this embodiment, a knob rod 50 penetrates through the slot 43 and fixedly connects the second fastener 40 from the fixing piece 42 to a nut stand 14 on the frame case 10.

Thus, as shown in FIG. 1 and FIG. 2, the first fastener 30 and the second fastener 40 clamp and fix tightly the roof rack fixing structure 100 to a roof rack rod 900 of the roof rack 800. In other words, the first fastener 30 and the second fastener 40 clamp and fix tightly the roof rack fixing structure 100 to the longitudinal rod and the horizontal rod of the roof rack 800 on a car top.

Figure 3A:
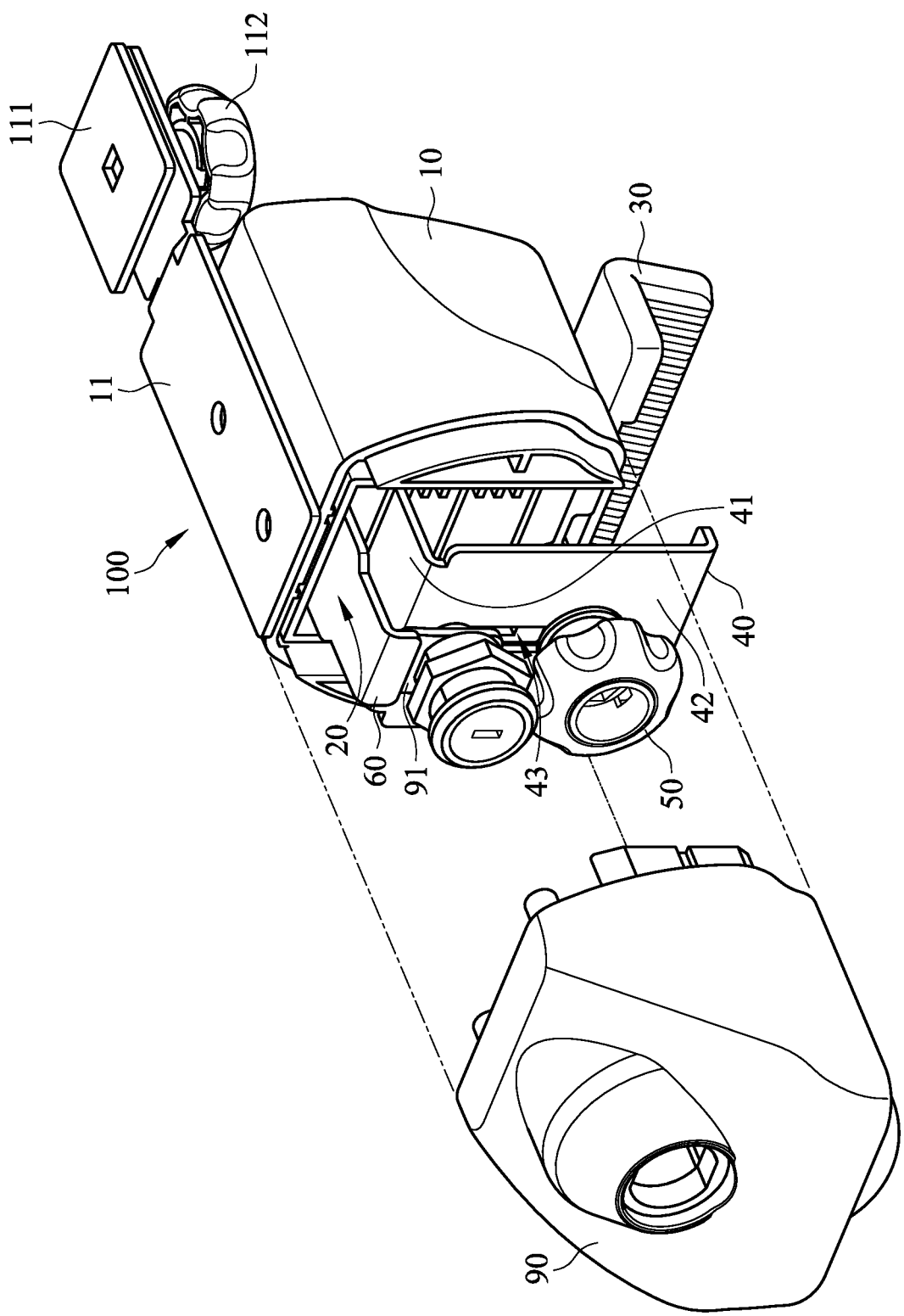
FIG. 3A is a schematic three-dimensional view of a roof rack fixing structure further comprises an antitheft part according to an embodiment of the present invention.
Figure 3B:
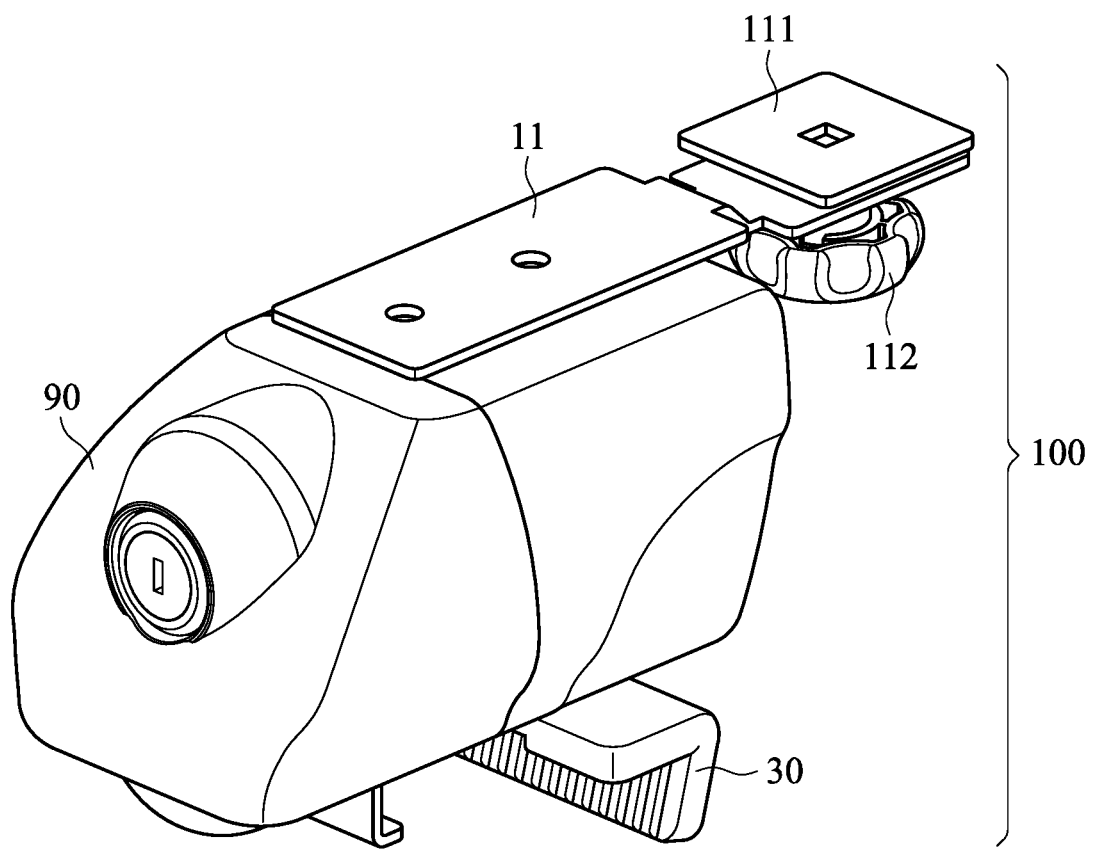
FIG. 3B is another three-dimensional view of the roof rack fixing structure that comprises an antitheft part according to the embodiment of FIG. 3A.
Figure 4:
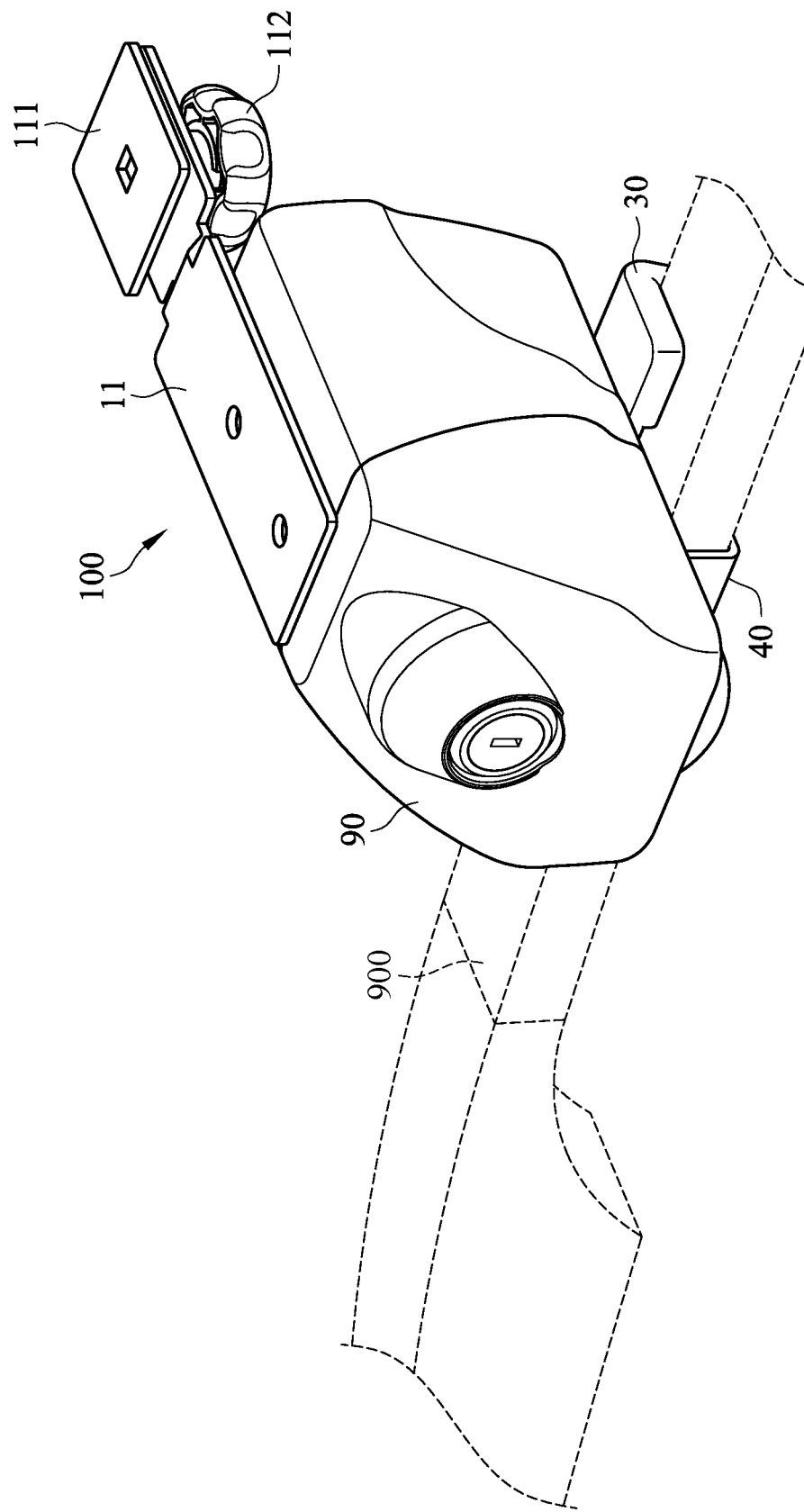
FIG. 4 is a schematic three-dimensional view of a roof rack fixing structure clamping on a roof rack rod of a car according to an embodiment of the present invention.

Furthermore, as shown in an embodiment as in FIG. 3A and FIG. 3B, the roof rack fixing structure 100 can further comprise a hook piece 60, setting inside the frame case 10 and extends outside the frame case 10 through the opening 20. An antitheft device 90 then locks from its lock piece 91 to the hook piece 60 to cover and seal the opening 20.

As such, aside from the benefit of antitheft merit, the roof rack fixing structure 100 can also be well set on the roof rack 800 and the roof rack rod 900 preventing it from being moved or sabotaged that may cause serious traffic problems.

As shown in the drawings from FIG. 1 to FIG. 4, in the embodiments of the roof rack fixing structure 100, the holding width from the first fastener 30 to the second fastener 40 for a roof rack rod 900 can be changed by changing the position of the first fastener 30 fixing to the frame case 10, further by changing the insert position of the insert piece 41 into the frame case 10, the clamping height between the roof rack 800 and the roof rack rod 900 clamped by the first fastener 30 and the second fastener 40 can be changed, that altogether provide applications to different car types or models and make the roof rack fixing structure 100 a general purpose one.

Figure 5:
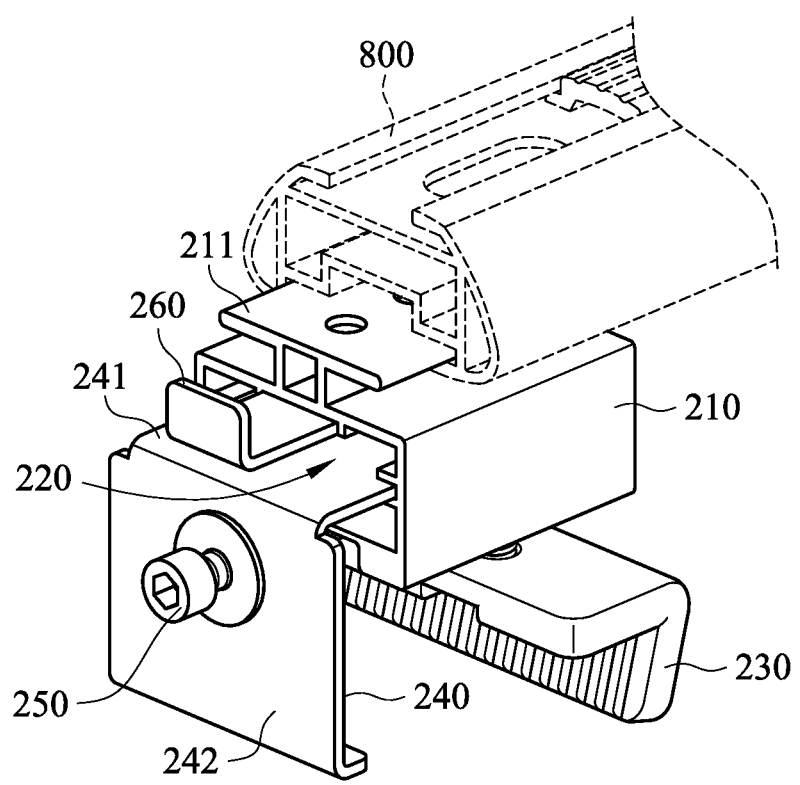
FIG. 5 is a schematic three-dimensional diagram of another roof rack fixing structure according to an embodiment of the present invention.

Please refer then to FIG. 5, a dedicated type roof rack fixing structure 200, used to fix a roof rack 800 on top of a car, comprising: a frame case 210, a first fastener 230, a second fastener 240, and a knob rod 250.

Figure 6:
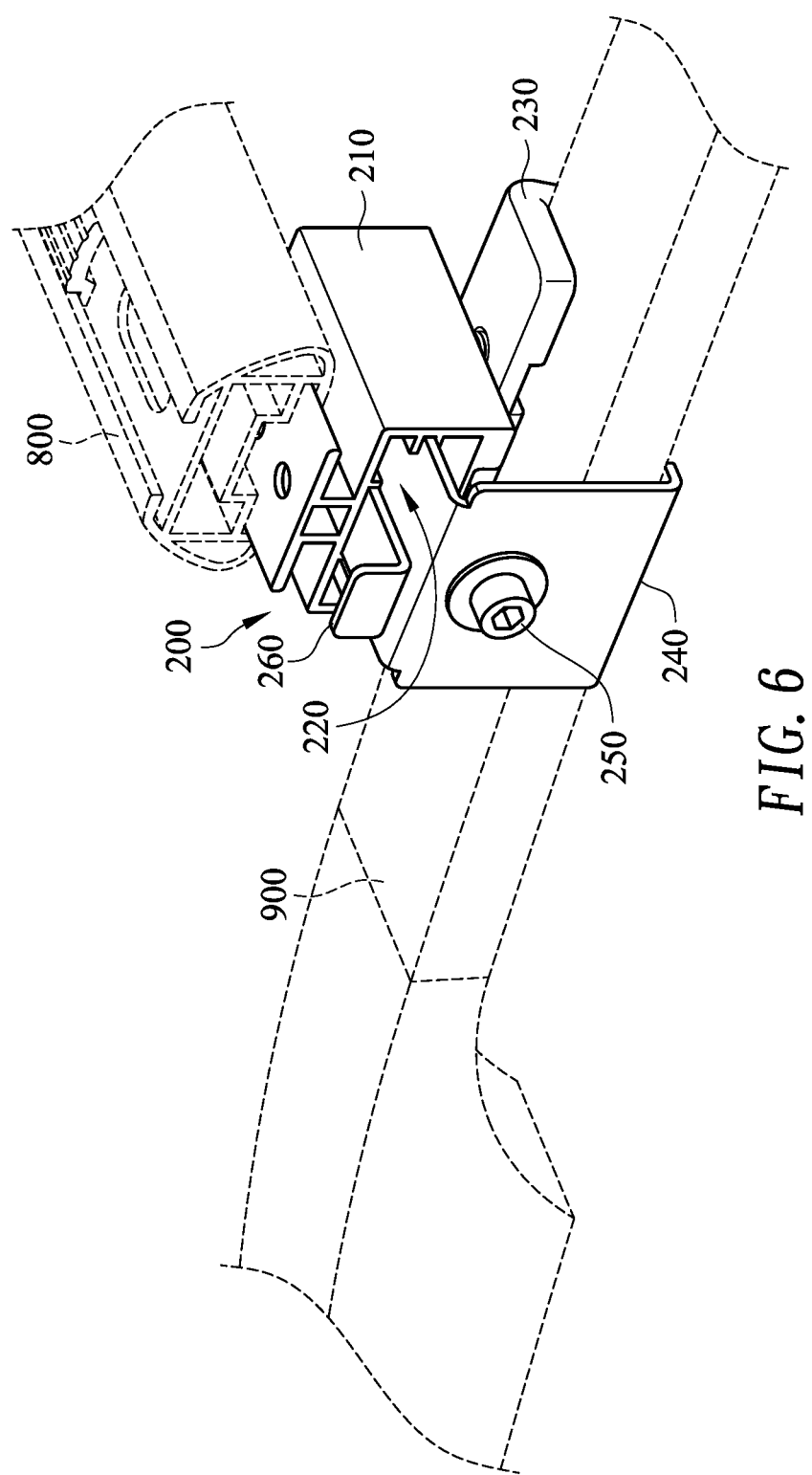
FIG. 6 is a schematic three-dimensional view of another roof rack fixing structure clamping on a roof rack rod of a car according to an embodiment of the present invention.

As shown in FIG. 5 and FIG. 6, being made by a sturdy material, frame case 210 has at least one opening 220 and a linking part 211 which being fixed firmly to a roof rack 800, wherein the linking part 211 can be fixed by at least one screw screwing it to the roof rack 800.

As shown in FIG. 5 and FIG. 6, the first fastener 230, which can be made of one of sturdy materials, is being detachably connected to the frame case 210. In an embodiment, the first fastener 230 is detachably connected to a surface opposite to the linking part 211 on the frame case 210.

As also in FIG. 5 and FIG. 6, the second fastener 40, which can also be made of a sturdy material, is being a bended part composes of an insert piece 241 and a fixing piece 242, wherein the fixing piece 242 being formed as an extension of the insert piece 241 by bending, and the insert piece 241 being detachably inserted into the frame case 210 through the opening 220, stops and fixed inside the frame case 210.

As shown in FIG. 6, the first fastener 230 and the second fastener 240 clamp and fix tightly the roof rack fixing structure 200 to a roof rack rod 900 of the roof rack 800.

Figure 7:
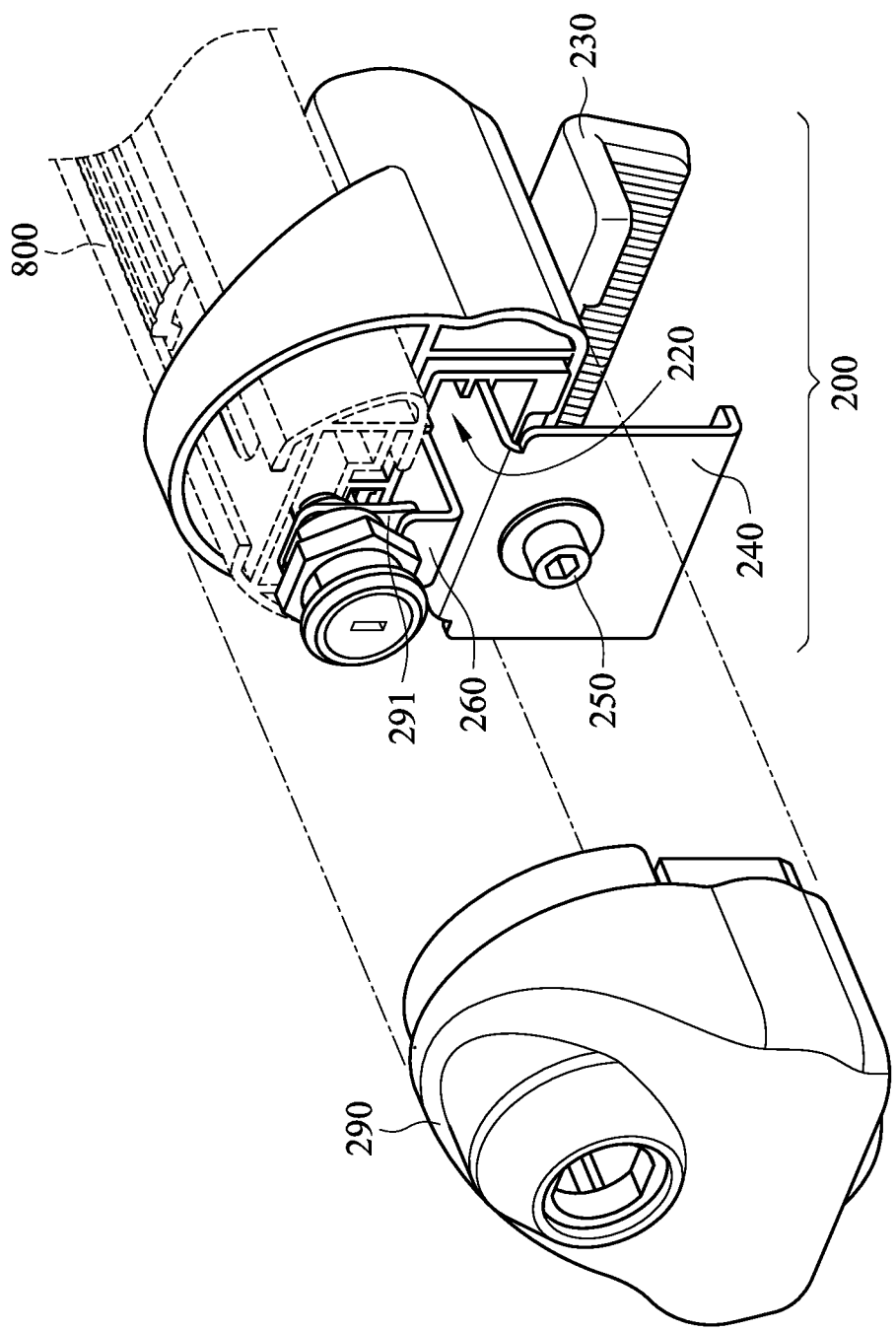
FIG. 7 is a schematic three-dimensional view of another roof rack fixing structure further comprises an antitheft part according to an embodiment of the present invention.

And as shown in FIG. 7, the roof rack fixing structure 200 can further comprise a hook piece 260, setting inside the frame case 210 and extends outside the frame case 210 through the opening 220. An antitheft device 290 then locks from its lock piece 291 to the hook piece 260 to cover and seal the opening 220.

Same as that in the embodiment of the roof rack fixing structure 100, aside from the benefit of antitheft merit, the roof rack fixing structure 200 can also be well set on the roof rack 800 and the roof rack rod 900 preventing it from being moved or sabotaged that may cause serious traffic problems.

As shown in FIG. 5 to FIG. 7, in the embodiments of the roof rack fixing structure 200, the holding width and the holding height clamped from the first fastener 230 to the second fastener 240 for roof rack rod 900 and between the roof rack 800 are both fixed, that altogether provide application to only one car type or model and make the roof rack fixing structure 200 a dedicated purpose one.

The embodiments described above are intended only to demonstrate the technical concept and features of the present invention to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A general purpose roof rack fixing structure, used to fix a roof rack on top of a car, comprising:
    a frame case, being formed by a solid material, comprises at least an opening, a linking part fixedly connected to the roof rack, at least one partition board fixedly installed inside the frame case, and a nut stand;
    a first fastener, being L shaped and formed by a solid material, detachably connected to the frame case;
    a second fastener, being L shaped and formed by a solid material, comprises an insert piece and a fixing piece with a slot, wherein the fixing piece is formed by bending and extending the insert piece, wherein the insert piece being detachably inserted into the opening and fixed in between two partition boards or in between a partition board and the frame case;
    a knob rod, being inserted through the slot and fixing the second fastener to the nut stand through the fixing piece, and
    a hook piece, installed inside and extending out the frame case, locking together with a lock piece of an antitheft device to cover and seal the opening.

2. The roof rack fixing structure according to claim 1, wherein said linking part being fixed to the roof rack by sliding an insertion part into the roof rack and fixing the insertion part to the roof rack by fastening a knob.

3. The roof rack fixing structure according to claim 1, wherein said first fastener being detachably installed on a side face of the frame case, wherein the said side face being opposite to the linking part.

4. The roof rack fixing structure according to claim 1, wherein said first fastener and said second fastener fix the roof rack fixing structure to the roof rack and roof rack fixing rod of the car.

5. The roof rack fixing structure according to claim 1, wherein the said linking part being passed through the frame case and fixed on the hook piece.

6. A dedicated type roof rack fixing structure, used to fix a roof rack on top of a car, comprising:
    a frame case, being formed by a solid material, comprises at least an opening and a linking part fixedly connected to the roof rack;
    a first fastener, being L shaped and formed by a solid material, detachably connected to the frame case;
    a second fastener, being L shaped and formed by a solid material, comprises an insert piece and a fixing piece, wherein the fixing piece being a bended extension of the insert piece, wherein the insert piece being detachably inserted into the opening and fixed inside the frame case;
    a knob rod, fixing the fixing piece to the frame case, and
    a hook piece, installed inside and extending out the frame case, locking together with a lock piece of an antitheft device to cover and seal the opening.

7. The roof rack fixing structure according to claim 6, wherein said linking part being fixed to the roof rack by at least one screw.

8. The roof rack fixing structure according to claim 6, wherein said first fastener being detachably installed on a side face of the frame case, wherein the said side face being opposite to the linking part.

9. The roof rack fixing structure according to claim 6, wherein said first fastener and said second fastener fix the roof rack fixing structure to the roof rack and roof rack fixing rod of the car.

* * * * *